United States Patent [19]

Mize

[11] 4,078,224

[45] Mar. 7, 1978

[54] ELECTRONIC ROLL WARNING SYSTEM FOR VEHICLES

[76] Inventor: Lawrence A. Mize, 161 Minorca Way, Millbrae, Calif. 94030

[21] Appl. No.: 700,412

[22] Filed: Jun. 25, 1976

[51] Int. Cl.$^2$ ............................................. G08B 21/00
[52] U.S. Cl. ............................ 340/52 H; 340/267 C; 340/285
[58] Field of Search ...................... 340/52 R, 52 H, 58, 340/199, 253 H, 253 N, 267 R, 267 C, 272, 285

[56] References Cited

U.S. PATENT DOCUMENTS

| | | | |
|---|---|---|---|
| 3,009,056 | 11/1961 | Bone et al. | 340/285 UX |
| 3,713,129 | 1/1973 | Buchholz | 340/267 C |
| 3,824,578 | 7/1974 | Harders | 340/267 C |
| 3,993,166 | 11/1976 | Sendur | 340/267 C X |

FOREIGN PATENT DOCUMENTS 953,613  3/1964  United Kingdom ............. 340/267 C

*Primary Examiner*—Alvin H. Waring
*Attorney, Agent, or Firm*—Townsend and Townsend

[57] ABSTRACT

A roll warning system to alert a vehicle operator of the amount of transverse weight shift or roll of the vehicle. The warning system includes a pair of strain sensing units mounted to opposing suspension units of the vehicle, voltage generating circuitry responsive to the strain measuring units, and output circuitry responsive to the voltage generating circuitry for providing the warning indicia to the operator. Each strain sensing unit responds to the distortion induced by the weight of the vehicle in the suspension unit to which the sensing unit is attached by generating a signal representative of such distortion. The voltage generating circuitry receives these distortion representative signals, amplifies their difference, and generates a voltage representative of the difference in weight supported by each of the opposing suspension units. A number of individual warning devices, included in the output circuitry, are operated in response to predetected levels of the magnitude of the weight difference representative voltage to inform the operator of the transverse weight shift of the vehicle from one side to the other.

7 Claims, 4 Drawing Figures

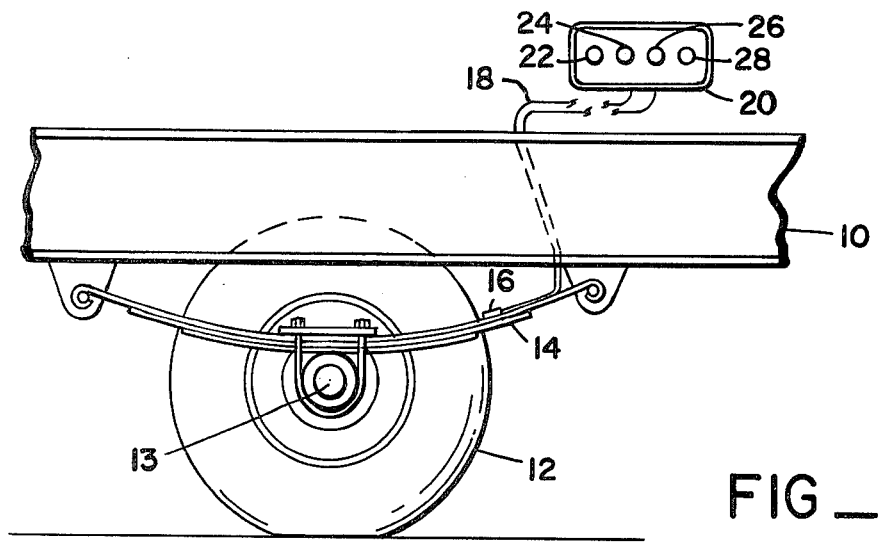
FIG_1
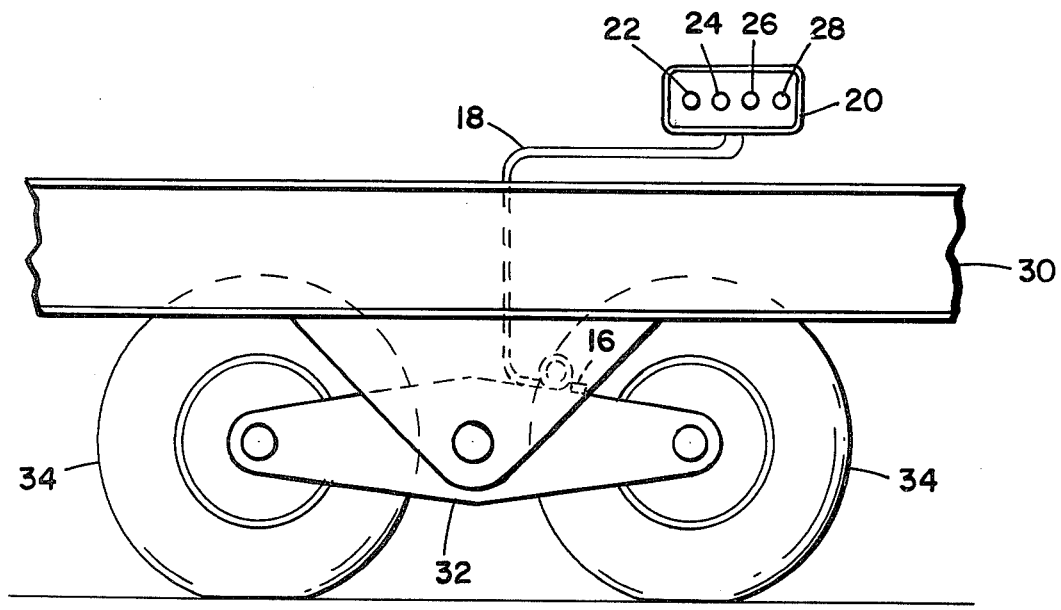
FIG_2
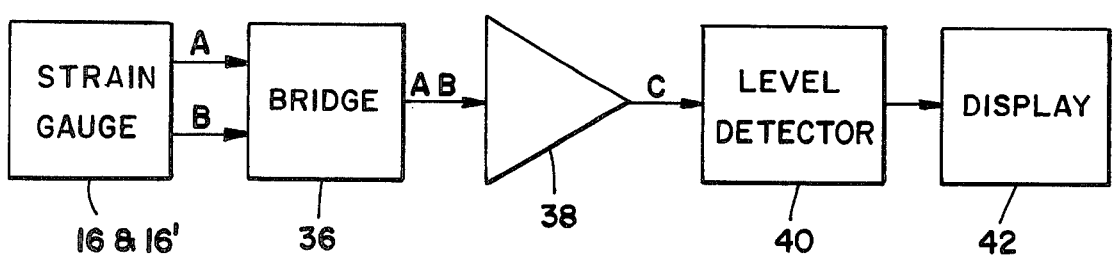
FIG_3

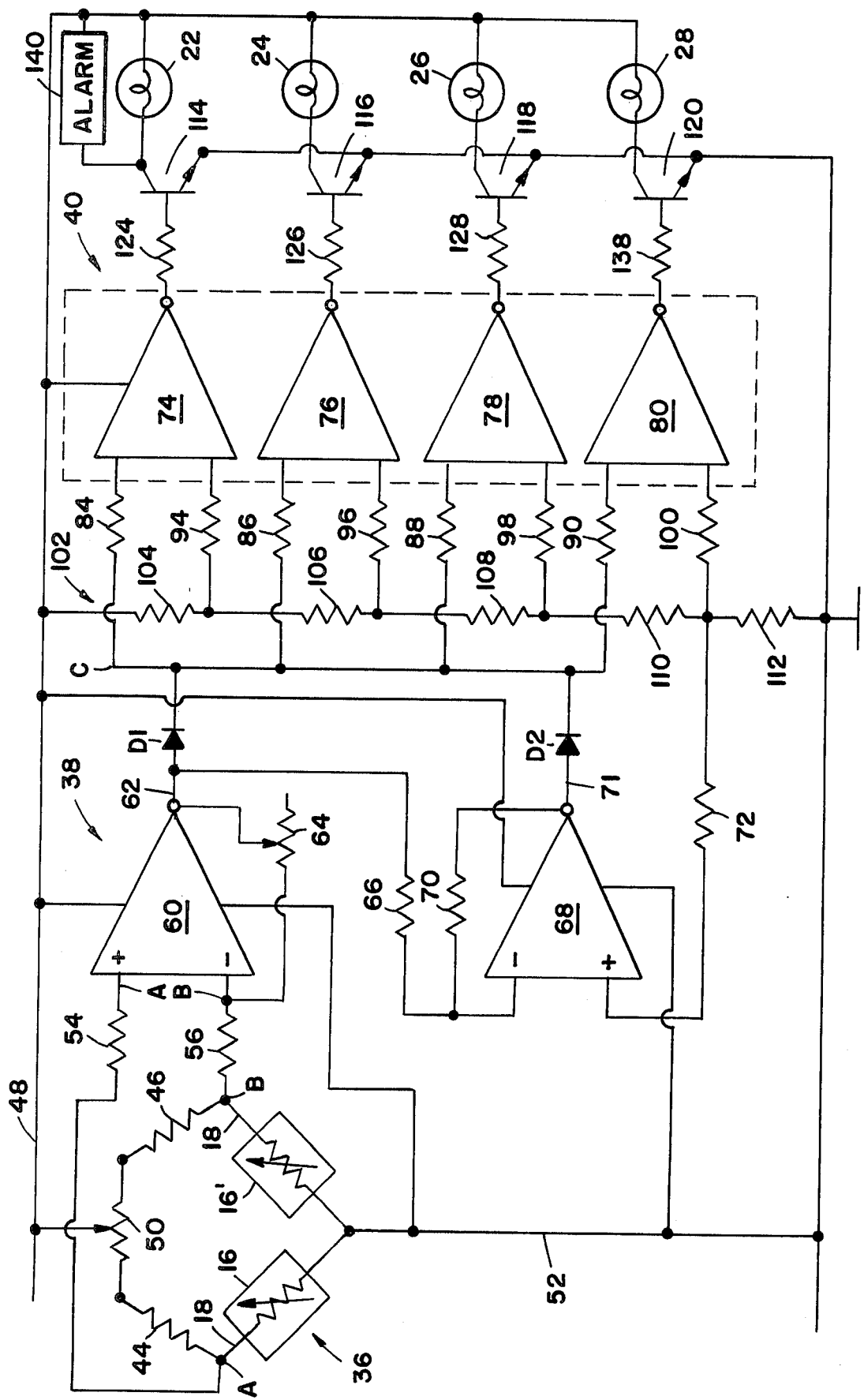
FIG_4

ELECTRONIC ROLL WARNING SYSTEM FOR VEHICLES

This invention relates to electronic roll warning systems for vehicles and more particularly to an electronic roll warning system that uses strain sensing devices mounted to the vehicle suspension units to detect transverse weight shifts of the vehicle.

DESCRIPTION OF THE PRIOR ART

Centrifugal forces imparted to a vehicle negotiating a turn tend to cause a weight shift from one side of the vehicle to the other. Such weight shift, in turn, imparts a tipping or transverse rolling action to the vehicle which is dependent upon the speed of the vehicle and the radius of the turn. Often, it is difficult for the driver to determine when the centrifugal forces approach the level sufficient to cause the vehicle to overturn. As a result, the driver will proceed at a lower speed than optimum as an extra safety precaution. However, even such precautions do not compensate for other possible overturning forces, about which the driver may not be alerted, such as high winds or road hazards, which may be sufficient to overturn or roll the vehicle.

In sprung vehicles, the tipping forces produce a loss in weight on the wheels located on one side of the vehicle, causing the springs associated therewith to decompress in proportion to this loss in weight. This decompression is accompanied by a proportional increase in the spacing between the frame and the axle of the vehicle over the wheel. Presently known, roll warning devices operate on this increase in spacing to trigger a sending unit, when a predetermined level has been reached or exceeded, to energize a warning signal disposed near the operator of the vehicle. U.S. Pat. No. 3,693,145 generally describes such a warning device.

Such prior art roll warning devices are not without certain problems. Many such devices are limited to use upon vehicles having spring mounted wheels or similar suspension systems only. Thus, a vehicle utilizing a suspension system that does not produce an increase in spacing between the frame and axle of the vehicle, in response to the transverse weight shift from one side of the vehicle to the other, would not be able to use such roll warning devices.

Moreover, many of the prior art devices fail to take into consideration possible malfunction of system components. For example, some systems detect spring decompression by mechanically connecting a frame-mounted sensing unit to the spring via a flexible member or cable. Should such flexible member or cable break, the roll warning system becomes inoperative, a condition which the operator of the vehicle is not made aware, with possible disastrous results. Further, such known warning systems utilize detecting units which, due to their place of mounting (i.e., the frame), are subjected to a harsh and dirtfilled operating environment. This operating environment can and has led to malfunctions which, again unknown to the driver, results in an inoperative warning system.

Thus, it has become apparent that there exists a need for a roll warning device capable of being used upon sprung and unspring vehicles (a "walking beam" type of suspension is illustrative of the latter). Further, a need also exists for a roll warning system that is fail-safe in operation; that is, a warning system that is capable of alerting the operator to a possible malfunction of the system so that he may proceed accordingly.

SUMMARY OF THE INVENTION

In view of these needs, therefore, the present invention provides a roll warning system capable of being used with many types of suspension systems that couple opposing wheels to the vehicle. In addition to the ability of using the present invention upon sprung vehicles, it is also capable of being used upon vehicles having suspension systems that do not provide spacing variations between the frame and the axle of the vehicle in response to loss in weight on the wheels or transverse weight shifting. The present invention includes a pair of strain sensing units for generating a signal representative of transverse weight shift of the vehicle, amplifying circuitry for generating a voltage representative of the absolute value of said signal, level detecting circuitry for detecting predetermined levels of said voltage, and output circuitry having a number of warning devices actuated by the level detecting circuitry in response to detected levels of the voltage.

Each strain sensing unit is mounted to the suspension units of opposing wheels of the vehicle. The sensing unit is located on each suspension unit so that deformation, in response to the portion of the vehicle weight supported by the suspension unit, is sensed by the unit which develops a signal in response thereto. Each signal is, therefore, a dynamic representation of the portion of the vehicle weight supported by the particular suspension unit to which the sensing unit is attached.

The signals are coupled, by appropriate electrical wiring, to the remaining warning circuitry situated near the vehicle operator. The two signals are applied to the amplifying circuitry which generates a voltage that is the absolute value of the difference of the strain gauge signals.

The amplifier output voltage is applied to the level detecting circuitry. As the voltage reaches and/or exceeds certain predetermined voltage levels, the detecting circuitry, in response thereto, activates one or more warning devices contained in the output circuitry.

Thus, when the vehicle is subjected to tipping forces, the weight of the vehicle will shift from one suspension unit to the opposing suspension unit. In response to such a weight shift, the suspension units will deform accordingly. For example, in a sprung vehicle, the spring mounting the wheel to the side of the vehicle from which the weight is shifting, will decompress; alternately, the spring on the opposing side of the vehicle will compress. Vehicles using the "walking beam" type of suspension units will undergo similar deformations. These deformations of the respective suspension units are sensed by the strain sensing units and used to generate two signals. The difference of these two generated signals is representative of the transverse weight shift of the vehicle from one suspension unit to the opposite suspension unit. This signal difference is amplified to generate the voltage representing the absolute value of this difference. Since increasing levels of this voltage will represent amounts of transverse weight shift of the vehicle, predetermined levels are detected, by the level detector, and detector signals generated to actuate predetermined warning devices to alert the driver of tipping of the vehicle as well as approximately how much tip the vehicle is encountering.

The present invention obtains a number of advantages over prior art roll warning systems. For example, the present invention requires no mechanical connection or linkages which can make the system difficult and time consuming to install and may even require modification of the vehicle. Moreover, since only the strain gauges are mounted in the harsh environment of the suspension unit the remainder of the system is removed from such an operating environment. Further, in the event one of the sensing units, which in the preferred embodiment are resistive in nature, becomes damaged or a separation of the wiring occurs, the circuitry of the system views the damaged strain gauge or interrupted wire as a large resistance and responds by activating, simultaneously, all warning devices. This informs the operator of the vehicle that a malfunction has arisen. Thus, a fail-safe aspect is included in the present invention.

Another advantage of the present invention is ease of installation. Since the strain gauges may be merely bonded to the suspension unit, no special modification of the vehicle is necessary.

For a fuller understanding of the nature and advantages of the present invention, reference should be had to the ensuing detailed description taken in conjunction with the accompanying drawings.

BRIEF DESCRIPTION OF THE DRAWINGS

FIGS. 1 and 2 are diagrammatic views of the roll warning system for vehicles according to the present invention;

FIG. 3 is a block diagram of the apparatus depicted in FIGS. 1 and 2; and

FIG. 4 is a schematic diagram of the apparatus depicted in the block diagram of FIG. 3

DETAILED DESCRIPTION OF THE PREFERRED EMBODIMENT

Turning now to the drawings, FIGS. 1 and 2 illustrate two different types of vehicle suspension units with which the present invention may be used to sense any tipping forces exerted on the vehicle. Thus, in Fig. 1 there is shown a frame member 10 of a vehicle to which is mounted an axle 13 by a leaf spring 14. Rotatably coupled to axle 13 is wheel 12. Attached to spring 14 is the weight sensing unit or strain gauge 16, with electrical connection 18 to warning lights 22-28 situated upon warning unit 20.

FIG. 2 illustrates the use of the roll warning device of the present invention on a vehicle utilizing a type of suspension commonly referred to as a "walking beam." Thus, as shown, a walking beam 32 is coupled to frame member 30 and has wheels 34 rotatably attached at each end thereof.

The function of walking beam 32 is basically the same as leaf spring 14. That is, both spring 14 and walking beam 32 act to cushion the vehicle from the shocks and impacts imparted to the wheels by the road conditions over which vehicle travels. This cushioning and absorption of shocks will result, at least in part, in deformations of certain elements of the particular suspension unit used. Thus, the individual leaves of the spring 14 or the walking beam 32 itself, will deform a certain amount in response to the portion vehicle weight supported by the suspension unit. It is this weight-causing deformation that the present invention senses, through the use of strain gauge 16, to detect transverse weight shifts of the vehicle, as will be explained fully below.

It is to be noted that the foregoing vehicle suspension systems are old and are described for illustrative purposes only. It should be understood, therefore, that the warning system according to the present invention may be readily adapted for use with other types of vehicle suspension systems.

One general arrangement which may be used to realize the roll warning system of the present invention is schematically shown in FIG. 3. Briefly, strain gauges 16 and 16' are attached to opposing suspension units (not shown), located on each side of the vehicle, and on a portion of the units deformably sensitive to the weight of the vehicle. The strain gauges 16 and 16' dynamically sense the deformations produced by weight variations imparted to each suspension unit, to which the respective strain gauge is attached, by the vehicle. In response, each of the strain gauges 16 and 16' generates signals A and B, respectively, which are electrically coupled to amplifier 38 via bridge 36, as a difference signal AB. Amplifier 38 amplifies the signal AB and generates therefrom a positive voltage C that is representative of the absolute magnitude of the amplified difference signal AB. Predetermined levels of voltage C are detected by level detector 40. Level detector 40 drives display 42, which includes warning lights 22-28 (FIGS. 1 and 2).

FIG. 4 schematically represents a preferred embodiment of the warning system. As illustrated, strain gauges 16 and 16' comprise two inter-connected and parallel arms of the resistive bridge circuit 36. Bridge circuit 36 is commonly known in the art as a wheatstone bridge and, in addition to the strain gauges, includes resistors 44 and 46 electrically connected to the supply voltage 48 of the vehicle via potentiometer 50. The strain gauges 16 and 16' both have one lead electrically connected to the common ground 52 of the vehicle. The remaining leads of strain gauges 16 and 16' are connected to bridge resistors 44 and 46, respectively, and input resistors 54 and 56, respectively, of operational amplifier 60.

Strain gauges 16 and 16' are resistive in nature, their respective resistances being variable in response to the amount of deformation or strain they undergo in response to the deformation of the member to which they may be attached. For proper operation of the bridge circuit, strain gauges 16 and 16' as well as bridge resistors 44 and 46 should be approximately equal in value. Moreover, in view of the fact that strain gauges 16 and 16' are, as presently contemplated, mounted at a location (i.e., on the particular suspension unit) remote from the remainder of the circuitry, the resistances of the strain gauges and bridge circuit as well as resistors 54 and 56 should be of a low value to minimize noise problems.

Potentiometer 50 is used to initialize the system to steady-state conditions of the vehicle. Thus, potentiometer 50 is used to cause signals A and B, generated by strain gauges 16 and 16', respectively, to be equal when the vehicle is stopped on a level, flat surface. The difference signal AB is, therefore, approximately zero.

This difference signal AB is amplified by operational amplifier 60. Amplifier 60 is a conventional amplifier, such as that manufactured by National Semiconductor under the part number LM1458. Amplifier 60 amplifies the difference of the voltages impressed across strain gauges 16 and 16', as applied to the amplifier through input resistors 54 and 56, respectively. The output 62 of amplifier 60 is offset by approximately a positive 12 volts, when the vehicle supply voltage 48 is a positive 6 volts, by gain control resistor 64. Amplifier output 62, therefore, provides a voltage that varies about a positive 6 volt level to input point C of level detector 40 via diode D1. Amplifier output 62 is also applied to input C by a voltage-follower inverter circuit input resistor 66, amplifier 68 and feedback resistor 70. Output 71 of inverter 68, which may also be the same type of operational amplifier as that used for amplifier 60, is offset approximately a positive six volts so that the voltages appearing at outputs 62 and 71 will both vary about plus six volts, as the difference signal AB varies, by an amount equal in magnitude but different in direction. Bias resistor 72 couples approximately a plus volts from ladder network 102 to obtain the 6 volt offset. Amplifier 68 is coupled to input point C of level detector 40 by diode D2.

The voltages appearing at amplifier outputs 62 and 71 are coupled to input resistors 84–90 of level detector 40 by diodes D1 and D2. As can be seen in FIG. 4, the interconnecting configuration of diodes D1 and D2 ensure that voltage C will always be a positive six volts or greater — since both amplifier outputs 62 and 71 vary about positive six volts. In effect, therefore, voltage C is the absolute magnitude of the amplified difference between signals A and B.

Level detector 40 includes four individual level detectors 74–80. Level detectors 74–80 may be implemented by quad-level detectors such as those manufactured by National Semiconductor under the part number LM3900. The detecting input of each level detector 74–80 is electrically connected to diodes D1 and D2 through input resistors 84–90. The reference inputs of detectors 74–80 are coupled, via reference input resistors 94–100, to a resistive ladder 102 which includes series ladder resistors 104–112. Resistor ladder 102 divides the supply voltage 48 into four predetermined reference levels.

The individual level detectors 74–80 are coupled to driver transistors 114–120 by base resistors 124–130, respectively. The driver transistors 114–120 are used to turn on and drive warning lamps 22–28, as well as alarm 140.

Warning lamps 22–28, which are colored red, yellow, blue, and green lights, respectively, light to indicate to the vehicle operator predetermined levels of transverse tip or roll of the vehicle resulting from transverse weight shift. Additionally, alarm 140 provides an audible signal to alert the operator that the vehicle has exceeded a maximum predetermined level of transverse weight shift and that possible rolling or capsize of the vehicle may be imminent.

In use, strain gauges 16 and 16' are mounted upon opposing suspension units of the vehicle. Each strain gauge is located on the suspension unit to which it is mounted so that the strain gauge may experience and sense the deformation of the suspension unit in response to the portion of the vehicle weight imparted thereto. At present, contact cement has been found to be the preferable medium for attaching each strain gauge to the suspension unit. Contact cement possesses a certain amount of elasticity and is, therefore, more capable of absorbing the shock and impacts it must receive without destroying the bond between the strain gauge and the suspension unit.

Thus, in FIG. 1, strain gauge 16 would be attached or otherwise mounted to leaf spring 14 at one end of axle 13, while strain gauge 16' would be mounted to the leaf spring (not shown) coupling the opposite end of axle 13 to the vehicle. Moreover, the respective strain gauges should be mounted in approximately the same place on each suspension unit. The foregoing applies equally to vehicles that utilize the walking beam or other types of suspension units.

So attached, strain gauges 16 and 16' are coupled to the remainder of the warning system of the present invention via electrical leads 18. This allows the remainder of the warning system to be mounted at a location removed from the harsh environment experienced by the strain gauges. Thus, bridge circuit 36, amplifier 38, level detector 40, and display 42 are all contained within warning unit 20, which is preferably mounted at a location near the operator of the vehicle.

Once the strain gauges 16, 16' and warning unit 20 have been appropriately attached to the vehicle, the system is initialized as follows. The vehicle is parked on a smooth level surface. In this "quiescent" state, potentiometer 50 is adjusted so that all warning lights 22–28 are out. This indicates that the voltage developed by strain gauges 16 and 16' are equal which, in turn, is indicative of zero transverse weight shift in either direction of the vehicle.

One side of the vehicle is lifted so that the wheel 12 or wheels 34 (FIGS. 1 and 2) are suspended from the ground. This, in effect, simulates a 75 percent transverse weight shift or roll condition, since a portion of the weight is still supported by the means used to lift the side of the vehicle. With the side of the vehicle so lifted, gain control potentiometer 64 is adjusted so that light 22 (as well as lights 24–28) is lit and alarm 140 is actuated. The alarm and maximum limit (red) light 22 are thereby set to indicate a 75 percent roll condition. Thus, certain safety factor is built into the system. The remaining levels of transverse weight shift detection, to light the remaining warning lights 24–28, are set by selecting appropriate values for resistors 104–112 of ladder network 102.

With the system attached and calibrated as described above, it can readily be seen that strain gauge 16 will be responsive to the increase or decrease in weight on wheel 12 (FIG. 1) or, alternately, wheels 34 (FIG. 2) as the vehicle weight shifts to or from that side. Alternately, strain gauge 16' will be similarly responsive to the increase or decrease in weight on the wheel or wheels (not shown) on the opposite side of the vehicle. Additionally, as is probably now apparent, the roll warning system will be responsive to tipping of the vehicle in either direction.

In operation, tipping forces exerted on the vehicle, such as centrifugal forces encountered in turning, wind, or road conditions, will cause a transverse weight shift of the vehicle with a resultant deformation of the particular suspension units on each side of the vehicle. In turn, these deformations cause strain gauges to produce the difference signal AB, from which voltage C, the amplified absolute magnitude of signal AB, is generated. So long as such shifts in weight do not exceed an 18 percent weight shift, the roll warning system will remain inactive, and will, therefore, not interfere with the normal operation of the vehicle.

However, tipping forces exerted on the vehicle can cause strain gauges 16 and 16' to ultimately generate signals to cause voltage C to exceed one or more of the voltage levels set by the voltage divider ladder network 102. Thus, a tipping force which causes a transverse weight shift of the vehicle sufficient to the green (but not the blue) light alerts the vehicle operator to the presence of such tipping forces. If the tipping force and, in turn, the transverse weight shift upon the wheels of the vehicle, increases (in either direction) the blue, yellow and, if the maximum limit is reached or exceeded, the red lamp and warning alarm are activated. Each lamp will remain activated until the level of tipping or transverse weight shift it represents is below the representative level of the lamp.

Accordingly, the roll warning device according to the present invention functions to warn the operator of impending danger of possible rolling or turning over of the vehicle due to a shift in weight caused by centrifugal forces encountered in turning, or due to wind or road conditions. Furthermore, it is apparent that the apparatus according to the present invention may be readily added to an existing vehicle, with the degree or degrees of the danger of rolling or turning over upon which warnings are to be produced being readily presettable upon installation.

Furthermore, the warning system of the present invention includes a fail-safe design in the event of possible malfunction due to interruption of the interconnecting wires 18. Such a break in one of the leads connecting strain gauge 16 or strain gauge 16' to the remaining electronics, will be viewed by the bridge circuit as an extreme increase in resistance. This large resistance will be interpreted by the warning system as a large transverse weight shift and will, therefore, so inform the driver by lighting all lights and activating alarm 140. Thus, the driver will be notified, assuming he knows he is not undergoing tipping forces, will be informed of the malfunction.

While a particular embodiment of the present invention has been shown and described, it is to be understood that modifications or adaptations may be made without departing from the spirit and scope of the invention, as set forth in the claims.

I claim:

1. A roll warning system for a vehicle having wheels mounted to at least a pair of opposing sides thereof by a suspension unit, said warning system comprising:
   means coupled to said suspension unit for dynamically sensing the distortion imparted to said suspension unit by the weight of said vehicle and for generating therefrom a first linear signal representative of a transverse weight shift from the one side of said vehicle to the opposing side thereof;
   means for displaying warning indicia to a driver and including a plurality of warning devices, said warning indicia being representative of the amount of said transverse weight shift; and means interconnecting said sensing means and said display means for operating said display means in response to said first signal, said operating means including amplifying means for receiving said first signal and for generating therefrom a voltage proportional to an absolute value of said transverse weight shift and detecting means for detecting a plurality of predetermined levels of said voltage, said detecting means being coupled to said display means to activate at least one of said warning devices in response to a corresponding one of said detected levels.

2. A roll warning system for a vehicle having wheels coupled thereto by opposing suspension units mounted to each one of a longitudinal side of said vehicle, said warning system comprising:
   a first strain sensing means coupled to the suspension unit on one side of said vehicle for generating a first signal representative of the distortion imparted to the suspension unit by at least a portion of the weight of said vehicle;
   a second strain sensing means coupled to the opposing suspension unit on the opposite side of said vehicle for generating a second signal representative of the distortion imparted to the opposing suspension unit by at least a portion of the weight of the vehicle;
   combining means for receiving said first and second signals and for generating therefrom a signal voltage representative of the absolute difference in weight supported by said opposing suspension units;
   compare means for receiving and comparing said signal voltage to a plurality of predetermined reference voltage levels and for detecting a plurality of levels of said signal voltage; and
   output means responsive to said compare means for displaying warning indicia representative of the amount of transverse weight shift of said vehicle to an operator of said vehicle.

3. The warning system of claim 2, wherein said first and second strain sensing means comprises strain-sensitive resistors.

4. The warning system of claim 3, including an electrical bridge circuit; and wherein said first and second strain sensing means comprise two parallel and interconnected arms of said electrical bridge circuit.

5. The warning system of claim 2, wherein said output means includes a plurality of warning devices.

6. The warning system of claim 5, wherein said compare means includes a plurality of outputs for activating one or more of said warning devices in response to predetermined levels of said signal voltage.

7. A roll warning system for a vehicle having wheels mounted to each side thereof by a suspension unit, said warning system comprising:
   first means coupled to said suspension unit on one side of said vehicle for dynamically sensing the distortion imparted thereto by the weight of said vehicle and for generating a first linear signal representative of said distortion;
   second means coupled to the suspension unit on the other side of said vehicle for dynamically sensing the distortion imparted thereto by the weight of said vehicle and for generating a second linear signal representative of said distortion;
   means for displaying warning indicia to a driver, said warning indicia being representative of the amount of distortion imparted to said suspension unit; and
   means coupling said first and second sensing means to said display means for operating said display means in response to said first and second signals, the coupling means including means for combining said second signal with said first signal and for generating therefrom a voltage proportional to an absolute value of a difference between said first linear signal and said second linear signal, said voltage thereby being representative of the transverse weight shift from said one side of said vehicle to said opposite side of said vehicle.

* * * * *